United States Patent
Yang et al.

(10) Patent No.: US 8,205,123 B2
(45) Date of Patent: Jun. 19, 2012

(54) INTERLEAVER AND DE-INTERLEAVER FOR ITERATIVE CODE SYSTEMS

(75) Inventors: Shaohua Yang, San Jose, CA (US); Changyou Xu, Fremont, CA (US); Weijun Tan, Longmont, CO (US); Ching-Fu Wu, Milpitas, CA (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 861 days.

(21) Appl. No.: 12/315,601

(22) Filed: Dec. 4, 2008

(65) Prior Publication Data

US 2010/0146229 A1 Jun. 10, 2010

(51) Int. Cl.
*H03M 13/27* (2006.01)
(52) U.S. Cl. .................................. 714/701
(58) Field of Classification Search ............. 714/701
See application file for complete search history.

(56) References Cited

U.S. PATENT DOCUMENTS

| 4,370,732 A | * | 1/1983 | Kogge ............................. 711/5 |
| 4,918,600 A | * | 4/1990 | Harper et al. .................. 711/157 |
| 5,111,389 A | * | 5/1992 | McAuliffe et al. ............ 711/203 |
| 6,289,486 B1 | * | 9/2001 | Lee et al. ....................... 714/788 |
| 6,381,668 B1 | * | 4/2002 | Lunteren .......................... 711/5 |
| 6,662,332 B1 | * | 12/2003 | Kimmitt ....................... 714/762 |
| 6,775,800 B2 | * | 8/2004 | Edmonston et al. .......... 714/755 |
| 7,051,171 B1 | * | 5/2006 | Liu et al. ....................... 711/157 |
| 7,783,952 B2 | * | 8/2010 | Nimbalker et al. ............ 714/755 |
| 7,865,796 B2 | * | 1/2011 | Irving ............................ 714/752 |
| 7,979,772 B2 | * | 7/2011 | Oz et al. ........................ 714/752 |

* cited by examiner

*Primary Examiner* — Stephen Baker

(57) ABSTRACT

In exemplary embodiments, a skewed interleaving function for iterative code systems is described. The skewed interleaving function provides a skewed row and column memory partition and a layered structure for re-arranging data samples read from, for example, a first channel detector. An iterative decoder, such as an iterative decoder based on a low-density parity-check code (LDPC), might employ an element to de-skew the data from the interleaved memory partition before performing iterative decoding of the data, and then re-skew the information before passing decoded samples to the de-interleaver. The de-interleaver re-arranges the iterative decoded data samples in accordance with an inverse of the interleaver function before passing the decoded data samples to, for example, a second channel detector.

20 Claims, 6 Drawing Sheets

FIG. 1
100

```
[101]            [102]              [103]
CHANNEL    →   SMPI         →    MEMORY
DETECTOR       INTERLEAVER

[104]            [105]              [106]           [107]
(LDPC)     →   SMPI DE-     →    MEMORY    →    SOFT OUTPUT
DECODER        INTERLEAVER                       CHANNEL
                                                 DETECTOR
```

FIG. 2
200

| | | | | | | | | |
|---|---|---|---|---|---|---|---|---|
| $Y(1)$ | $Y(1+M_P)$ | ... | ... | ... | ... | ... | ... | $Y(1+PM_P)$ |
| $Y(2)$ | $Y(2+M_P)$ | ... | ... | ... | ... | ... | ... | ... |
| ... | ... | ... | ... | ... | ... | ... | ... | ... |
| $Y(M_P)$ | $Y(2M_P)$ | ... | ... | ... | ... | ... | ... | ... |
| $X(1)$ | $X(1+M_U)$ | ... | ... | ... | ... | ... | ... | $X(1+PM_U)$ |
| $X(2)$ | $X(2+M_U)$ | ... | ... | ... | ... | ... | ... | ... |
| ... | ... | ... | ... | ... | ... | ... | ... | ... |
| $X(M_U)$ | $X(2M_U)$ | ... | ... | ... | ... | ... | ... | ... |

(202 brackets the first four rows; 203 brackets the last four rows)

|  | 302(1) | 302(2) | 302(3) | 303(1) | 303(2) | 303(3) | 304(1) | 304(2) | 304(3) | 305(1) | 305(2) | 305(3) |
|---|---|---|---|---|---|---|---|---|---|---|---|---|
| 310(1) | X(1) | X(1+M) | ⋮ | ⋮ | ⋮ | ⋮ | ⋮ | ⋮ | ⋮ | ⋮ | ⋮ | X(1+PM) |
| 310(2) | ⋮ | ⋮ | ⋮ | X(2) | X(2+M) | ⋮ | ⋮ | ⋮ | ⋮ | ⋮ | ⋮ | X(1+PM) |
| 310(3) | ⋮ | ⋮ | ⋮ | ⋮ | ⋮ | ⋮ | X(3) | X(3+M) | ⋮ | ⋮ | ⋮ | ⋮ |
| 310(4) | X(5) | X(5+M) | ⋮ | ⋮ | ⋮ | ⋮ | ⋮ | ⋮ | ⋮ | X(4) | X(4+M) | ⋮ |
| | ⋮ | ⋮ | ⋮ | X(6) | X(6+M) | ⋮ | ⋮ | ⋮ | ⋮ | ⋮ | ⋮ | ⋮ |
| | ⋮ | ⋮ | ⋮ | ⋮ | ⋮ | ⋮ | X(7) | X(7+M) | ⋮ | ⋮ | ⋮ | ⋮ |
| | X(9) | X(9+M) | ⋮ | ⋮ | ⋮ | ⋮ | ⋮ | ⋮ | ⋮ | X(8) | X(8+M) | ⋮ |
| | ⋮ | ⋮ | ⋮ | X(10) | X(10+M) | ⋮ | ⋮ | ⋮ | ⋮ | ⋮ | ⋮ | ⋮ |
| | ⋮ | ⋮ | ⋮ | ⋮ | ⋮ | ⋮ | X(11) | X(11+M) | ⋮ | ⋮ | ⋮ | ⋮ |
| | ⋮ | ⋮ | ⋮ | ⋮ | ⋮ | ⋮ | ⋮ | ⋮ | ⋮ | X(12) | X(12+M) | ⋮ |
| | ⋮ | ⋮ | ⋮ | ⋮ | ⋮ | ⋮ | ⋮ | ⋮ | ⋮ | ⋮ | ⋮ | ⋮ |
| 310(M) | ⋮ | ⋮ | ⋮ | ⋮ | ⋮ | ⋮ | ⋮ | ⋮ | ⋮ | ⋮ | ⋮ | ⋮ |

FIG. 5
500

| | 501a | 501b | 501c | 501d |
|---|---|---|---|---|
| 510(1) | X(1) | ... | ... | ... |
| 510(2) | X(1+M) | X(2) | ... | ... |
| | ... | X(2+M) | X(3) | ... |
| | ... | ... | X(3+M) | X(4) |
| | X(5) | ... | ... | X(4+M) |
| | X(5+M) | X(6) | ... | ... |
| | ... | X(6+M) | X(7) | ... |
| | ... | ... | X(7+M) | X(8) |
| | X(9) | ... | ... | X(8+M) |
| | X(9+M) | X(10) | ... | ... |
| | ... | X(10+M) | X(11) | ... |
| | ... | ... | X(11+M) | X(12) |
| | ... | ... | ... | X(12+M) |
| | ... | ... | ... | ... |
| | ... | ... | ... | ... |

• numRow=8

| | | | |
|---|---|---|---|
| 1 | 9 | 17 | 25 |
| 26 | 2 | 10 | 18 |
| 19 | 27 | 3 | 11 |
| 12 | 20 | 28 | 4 |
| 5 | 13 | 21 | 29 |
| 30 | 6 | 14 | 22 |
| 23 | 31 | 7 | 15 |
| 16 | 24 | 32 | 8 |

FIG. 7B

• numRow=8+2=10

| | | | |
|---|---|---|---|
| 1 | 21 | 11 | 31 |
| 32 | 2 | 22 | 12 |
| 13 | 33 | 3 | 23 |
| 24 | 14 | 34 | 4 |
| 5 | 25 | 15 | 35 |
| 36 | 6 | 26 | 16 |
| 17 | 37 | 7 | 27 |
| 28 | 18 | 38 | 8 |
| 9 | 29 | 19 | 39 |
| 40 | 10 | 30 | 20 |

FIG. 7C

• numRow=8+1=9

| | | | |
|---|---|---|---|
| 1 | 10 | 19 | 28 |
| 29 | 2 | 11 | 20 |
| 21 | 30 | 3 | 12 |
| 13 | 22 | 31 | 4 |
| 5 | 14 | 23 | 32 |
| 33 | 6 | 15 | 24 |
| 25 | 34 | 7 | 16 |
| 17 | 26 | 35 | 8 |
| 9 | 18 | 27 | 36 |

FIG. 7D

• numRow=8+3=11

| | | | |
|---|---|---|---|
| 1 | 34 | 23 | 12 |
| 13 | 2 | 35 | 24 |
| 25 | 14 | 3 | 36 |
| 37 | 26 | 15 | 4 |
| 5 | 38 | 27 | 16 |
| 17 | 6 | 39 | 28 |
| 29 | 18 | 7 | 40 |
| 41 | 30 | 19 | 8 |
| 9 | 42 | 31 | 20 |
| 21 | 10 | 43 | 32 |
| 33 | 22 | 11 | 44 |

INTERLEAVER AND DE-INTERLEAVER FOR ITERATIVE CODE SYSTEMS

BACKGROUND OF THE INVENTION

1. Field of the Invention

The present invention relates generally to communication systems, and, in particular, to decoding systems interleaving/de-interleaving data stored in memory.

2. Description of the Related Art

Many digital transmission systems commonly employ techniques for detection of digital data represented by a sequence of symbols. The symbol bits are transferred as a signal through a transmission (e.g., magnetic/optical storage or other communication) channel in which noise is typically added to the transmitted signal. For example, magnetic recording systems first encode data into symbol bits that are recorded on a magnetic medium. Writing data to, storing data in, and reading data from the magnetic medium may be considered to take place via a transmission channel that has an associated frequency response. Similarly, wired, optical, wireless, and cellular communication systems also transfer encoded data through a channel, which encoded data is then detected and decoded by a receiver. The signal may be read from the channel as a sampled signal (i.e., a sequence of sample values) representing the transmitted encoded data. For processing convenience, the encoding and decoding process is applied to blocks of data, each block representing a portion of the original data sequence.

A characteristic of some communication channels is the addition of "bursty" noise. Such noise may corrupt a transmitted signal for a period of time equivalent to the period of several transmitted symbols (either data or encoded data). The presence of bursty noise may cause burst errors in the received data which subsequently results in an increase Bit-Error Rate (BER) in the frame for any detection system employed to recover the data. Burst errors are typically difficult to recover by a partial response (PR) channel detector in an iterative decoding system, since the burst errors happen in a concentrated manner. To minimize the effect of burst errors, many magnetic storage or communication systems include an interleaver in the transmitter and a corresponding de-interleaver in the receiver. Interleaving is a mapping f(*) that generally comprises receiving a block of data having BLK values (i.e., BLK is the block length and BLK is an integer greater than one), and rearranging the order of the BLK values in the block. Interleaving may also be employed, for example, to remove non-random sequences of values in a data stream. By interleaving the symbols in a block of data prior to transmission through the channel, the de-interleaving process distributes the burst errors throughout the de-interleaved block.

In the data recording industry, an ongoing effort focuses on increasing the amount of information that can be stored and retrieved in various storage media. Unfortunately, increasing the recording density on a given medium (e.g., magnetic or optical) also causes a decrease in the Signal-to-Noise Ratio (SNR) of any data resident on the medium, which subsequently results in an increase Bit-Error Rate (BER) for any detection system employed to recover such resident data.

The performance of digital storage and communication systems with respect to degradation in SNR can be significantly improved by the use of any number of error correction code schemes. As a result, most, if not all, recording and communication systems use some form of error correction coding, which generally involves systematically adding redundant information to a stream of data to insure that individual bit errors generated during a particular write/read/transmission operation can be detected and corrected. In recent years, iterative correction codes have increasingly replaced the more traditionally used block and convolutional correction codes. Iterative codes, such as turbo codes and low-density parity-check (LDPC) codes, have shown very good performance for magnetic storage systems.

Low Density Parity Check (LDPC) codes are a class of linear block codes which provide a near capacity performance on a large collection of data transmission and storage channels. LDPC codes are well known in the art or communications and information theory, and were first proposed by Gallager in his 1960 doctoral dissertation (R. Gallager: "Low-density Parity Check Codes," IRE transformation series pp 21-28, January 1962). LPDC codes allow for methods of error detection and correction able to achieve near Shannon-limit channel communication. Generally, these methods include iterative decoding techniques that, when applied to sparse parity-check matrices, are capable of achieving a significant fraction of available channel capacity with relatively low complexity. LDPC codes are defined using sparse parity check matrices comprising a small number of non-zero entries.

Since LDPC codes are constructed by juxtaposing smaller circulant (or cyclic) submatices to form the larger parity check or base matrix, iterative decoders also use interleaving and de-interleaving techniques to generate a circulant for processing of read data. A circulant is a square binary matrix where each row is cyclic N-value shift of the row above it, where N is an integer greater than or equal to 1 (the end bit of a row being wrapped around to the beginning of the next row down). In these cases, interleaving is a mapping f(*) that generally comprises receiving a series of data samples representing both user data and parity check data read from, for example, a disk sector. User data bits and parity bits are generally interleaved separately, and LDPC parity bits are distributed through the user data in accordance with the LDPC code construction. This type of interleaving generally creates a 2-dimensional matrix (memory) of values, where the interleaving is defined for row-column ordering prior to applying the matrix to the LDPC decoder.

In order to decode a sequence of data samples read from, for example, a magnetic hard drive, an LDPC decoder requires an associated memory to collect and store a matrix of samples. Multi-way interleaving might be used to partition the associated memory. Multi-way interleaving, given two (or multiple) input LDPC sample matrices, might interleave rows of the two (or multiple) input matrices together in the memory to make efficient use of reading and writing data during the clock cycles, and to spread the burst errors into two (or multiple) component code words.

SUMMARY OF THE INVENTION

In an exemplary embodiment, the present invention allocates data samples to positions in memory defined with row and column addresses. In the exemplary embodiment, a memory partition is generated, wherein the memory partition comprises a plurality of modules, each module having corresponding locations in the memory defined by a set of row/column addresses. On a layer-by-layer basis, samples of sample sets from a sequence of samples are interleaved, wherein each layer comprises selected columns of each module, and interleaving each sample set comprises (i) allocating consecutive samples of the sample set to skewed-consecutive row addresses for the layer, and (ii) repeating (i) for subsequent sample sets for the layer based on a skewed-memory-partition interleaver (SMPI) function.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows an illustrative system employing one or more exemplary embodiments of the present invention;

FIG. 2 shows an exemplary input data matrix (memory content) that might be decoded by an LDPC decoder of FIG. 1;

FIG. 3 shows a memory partition after interleaving a sequence of input samples in accordance with the method of FIG. 4;

FIG. 5 shows a memory partition after interleaving a sequence of input samples in accordance with the method of FIG. 6;

FIGS. 7A-7D show sample position tables for the state machine in accordance with a second exemplary SMPI function of the present invention with number of memory module rows equivalent to 8, 9, 10, and 11, respectively.

DETAILED DESCRIPTION

Figure 4:
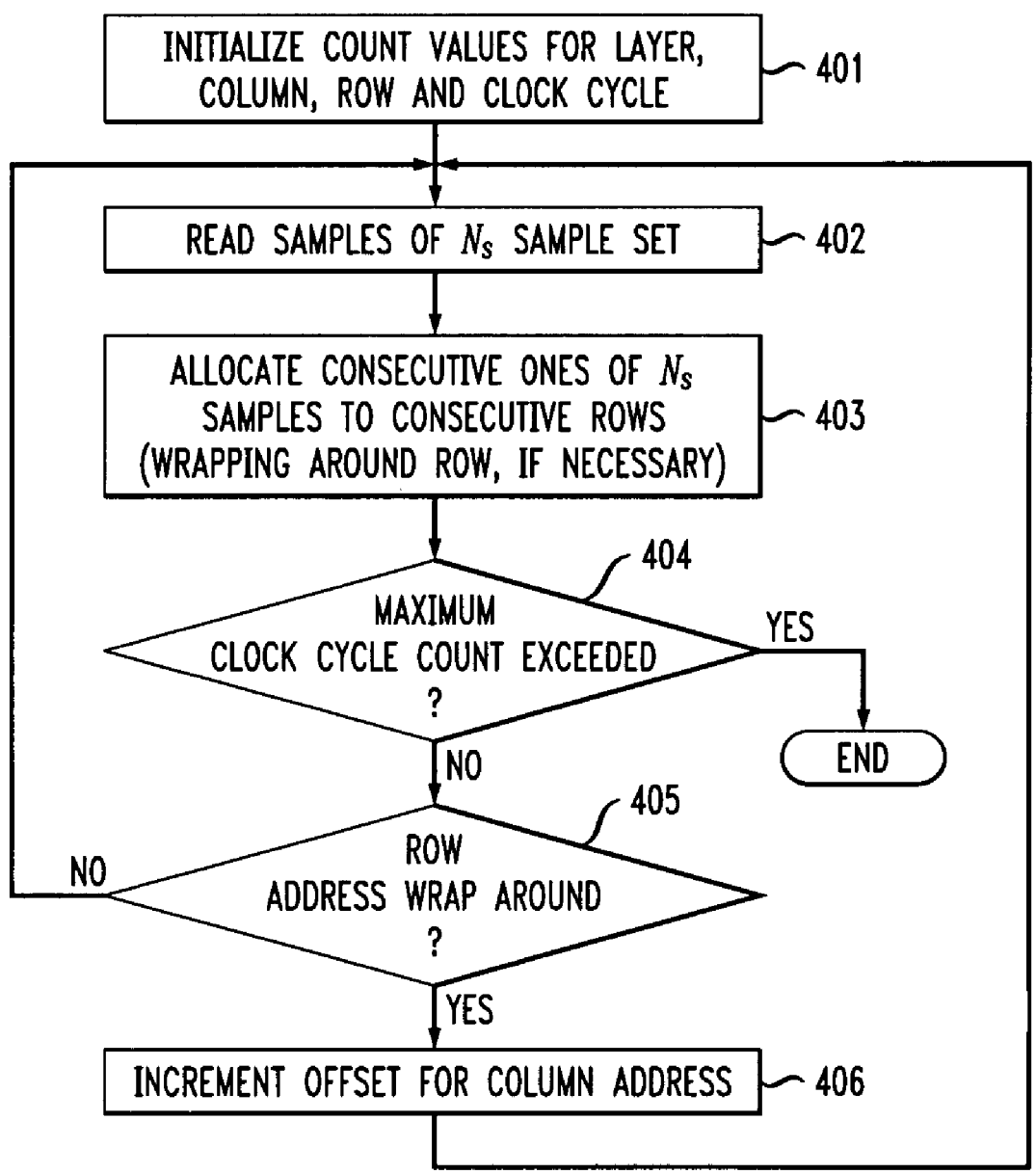
FIG. 4 shows a method for interleaving a sequence of input samples in accordance with a first exemplary skewed-memory-partition interleaver function of the present invention

As will be described, embodiments of the present invention provide an interleaver and deinterleaver for allocating data to a memory for use in, for example, iterative code systems. The interleaver employs an interleaver function having a skewed row and column memory partition and a layered structure for re-arranging data such as samples read from, for example, a channel detector. An iterative decoder, such as an iterative decoder based on a low-density parity-check code (LDPC), might employ an element to de-skew the data from the interleaver before performing iterative decoding of the data, and then re-skew the information before passing decoded data (samples) to the de-interleaver. The de-interleaver re-arranges the iterative decoded data samples in accordance with an inverse of the interleaver function before passing the decoded data samples to, for example, a second channel detector.

Referring first to FIG. 1, there is shown an illustrative system 100 employing one or more exemplary embodiments of the present invention. System 100 comprises soft output channel (SOC) detector 101, skewed-memory-partition interleaver function (SMPI) interleaver 102, memory 103, decoder 104, SMPI de-interleaver 105, memory 106, and soft output channel (SOC) detector 107. Channel detector 101 is employed to detect samples from a source, such as a magnetic hard drive, and provide these samples as sample sets at a predefined clock cycle rate. For the exemplary embodiments described herein, channel detector 101 might provide $N_s$ samples per clock cycle and might be configured to detect samples from a source having certain type of channel characteristics, such as a PRML (partial response maximum likelihood) read channel commonly employed in magnetic recording systems. Channel detector 101 provides soft and/or hard decisions to SMPI interleaver 102.

SMPI interleaver 102 applies an interleaving function in accordance with the present invention to the sequence of samples and provides the interleaved samples to memory 103 in a manner described subsequently. Decoder 104 operates on a matrix of input interleaved samples from memory 103 per clock cycle; consequently, memory 103 might be configured as two separate ping-pong memory blocks, wherein one memory block receives, or fills with, samples from channel detector 101 for one input matrix of interleaved samples to be decoded, while the other memory block provides soft and/or hard decisions for another input matrix to decoder 104.

Decoder 104 for the described embodiments herein is an LDPC decoder, although the present invention is not so limited. One skilled in the art might readily extend the teachings herein to other types of iterative decoders. As is known, an LDPC decoder operates on an input circulant matrix of samples, and for purposes of the following description, the circulant size (e.g., number of entries in a matrix row) is a fixed integer P, where P is an integer greater than 1 and evenly divisible by $N_{Block}$, where $N_{Block}$ is an integer number determined by the physical characteristics of the particular memory, or memory partition, used. The value for $N_{Block}$ for the described embodiments herein might be 4 corresponding to a side-by-side physical memory that maintains a desired sample value width when stored in a memory location. As described herein, the number M of rows in the matrix depends on the kind of user data, which, for a magnetic recording system, M might be an integer greater than 1 such that the M rows of memory cells might hold all the values in a data sector (sector length). In addition, since rows of the circulant matrix are cyclic shifts of one-another, an LDPC decoder also employs an associated barrel shifter to shift row values of the matrix for processing.

FIG. 2 shows an exemplary input matrix 200 that might be defined for decoding by an LDPC decoder. As shown in FIG. 2, matrix 200 includes parity bit section 202 and user bit section 203. SMPI interleaver 102 might apply the same interleaving function to samples corresponding to parity bits and samples corresponding to user bits separately. As shown, a sequence of samples read from a sector (either for parity bit section 202 or for user bit section 203) are inserted into a column of the table. To facilitate ease of understanding the present invention, the following description describes operations and processing corresponding to, for example, user bit section 203 for a sequence of user bits $X(1)$-$X(M_U)$ read from a first sector into column 1, bits $X(1+M_U)$-$X(2M_U)$ read from a second sector into column 2, and so on until the last column P. One skilled in the art might extend the teachings herein to similar operations and processing of other sections, such as the input sequence $Y(1)$-$Y(M_P)$, etc. for parity bit section 202. For the exemplary matrix 200 shown in FIG. 2, the total number of memory rows equals $M=M_U+M_P$.

Returning to FIG. 1, once decoder 104 has applied a decoding process to the input matrix of samples, decoder 104 provides a sequence of soft decisions corresponding to values represented by the samples of the input matrix. If the sequence of soft decisions is in an order corresponding to the interleaver function, the output sequence of soft decisions is de-interleaved in accordance with the inverse of the interleaver function applied by SMPI interleaver 102. The de-interleaved sequence of soft decisions is then applied to SOC detector 107, which applies a soft output decision detection algorithm, such as a SOVA (soft output Viterbi algorithm) or MAP (maximum a posteriori) algorithm to the de-interleaved sequence of soft decisions.

Operation of interleaver 102 and its corresponding interleaver function in accordance with embodiments of the present invention are now described. The interleaver function of interleaver 102 is termed herein as a skewed-memory-partition interleaver function since samples are allocated to skewed memory addresses, as described below. FIG. 3 shows a desired memory partition after interleaving a sequence of input samples in accordance with the method of FIG. 4. FIG. 4 shows a method for interleaving a sequence of input samples in accordance with a first exemplary SMPI function of the present invention.

As shown in FIG. 3, memory partition 300 comprises, or might be represented by, a matrix of M rows and P columns. In accordance with the first exemplary SMPI function, matrix 300 is divided into $N_{Block}$ physical memory modules, shown in FIG. 3 as modules 301(*a*), 301*b*, 301*c*, and 301*d*. Consequently, there are at least ($P/N_{Block}$) columns allocated for each memory module (defined herein as the "column-partitions"), and for the exemplary partition 300 of FIG. 3, $N_{Block}$ is 4 and ($P/N_{Block}$) is 3. A layer is defined based on the column partitions as follows: the ith layer contains the ith columns of each memory module. Consequently, for example, the first layer in FIG. 3 comprises columns 302(1), 303(1), 304(1), and 305(1), where memory module 301(*a*) comprises columns 302(1), 302(2), and 303(3) and so on. Similarly, the ith layer in FIG. 3 comprises columns 302(*i*), 303(*i*), 304(*i*), and 305(*i*).

In accordance with the exemplary method of FIG. 4, described subsequently, the system (e.g., system 100) writes $N_s$ samples per clock cycle into the memory partition. The row partition and column partition might preferably be set to the same value $N_s$, which might be selected as the greater of the values of $N_{Block}$ and $N_s$. Consequently, the $N_s$ samples per clock cycle are each assigned to different row/column memory addresses at each clock cycle, resulting in memory partition 300 divided into at least $N_s$ row groups (defined herein as "row partitions"). As known in the art of memory operations, terms "written", "read into", "allocated", or "stored" might be used interchangeably with the term "assigned" when referring to placement of a particular sample at a particular location in memory.

Samples assigned at a layer for the ith column partition is defined as consecutive samples assigned to memory starting as the ith layers's first column and subsequent columns in the ith layer, offset by integer multiples of P/N. For example, samples assigned on clock cycle 1 to layer 1 of FIG. 3 comprises: the sample x(1) placed at the position of row 1 (row 310(1)) and first column (column 302(1)) of module 301*a*, the sample x(2) placed at the position of row 2 (row 310(2)) and first column (column 303(1)) of module 301*b*, the sample x(3) placed at the position of row 3 (row 310(3)) and first column (304(1) of module 301*a*, and the sample x(4) placed at the position of row 4 (row 310(4)) and first column (column 305(1)) of module 301*a*. In this example, the four samples are written into different rows and different columns in the memory, and one sample into each memory partition, thus, memory access conflicts are avoided.

Referring to FIG. 4, method 400 interleaves samples written from detector 101 to memory 103 in accordance with memory partition 300 as follows. At step 401, the present memory address counts (or counter values) for the layer, column partition, and row partitions are initialized, beginning with row(1) and column (1) of layer 1. The total sample counter corresponding to the clock cycle count necessary to fill the input matrix to the LDPC decoder is also initialized. At step 402, during the first clock cycle, the first $N_s$ samples are read, (defined as x(i), where i is an integer and $1 \leq i \leq N_s$).

At step 403, consecutive samples are assigned to respective positions, or addresses, in consecutive rows in the present layer. Referring to FIG. 3, step 403 of FIG. 4 is illustrated by samples x(1), x(2), x(3), and x(4) being assigned to positions as follows: x(1) assigned to address at row 1, column 1 of the first layer, x(2) assigned to address at row 2, column 1 of the first layer, x(3) assigned to address at row 3, column 1 of the first layer, and x(4) assigned to address at row 4, column 1 of the first layer. More specifically, for the present layer n (e.g., for n=1, the x(1), x(2), x(3), and x(4)), samples are written to memory addresses corresponding to [column $C(offset_1+a)$, row R(b)], [column $C(offset_2+a+(P/N_{Block}))$, row R(b+1)], [column $C(offset_3+a+2(P/N_{Block}))$, row R(b+2)], . . . , [column $C(offset_{Ns-2}+a+(N_s-1)(P/N_{Block}))$, row $R(b+(N_s-1))$], where $offset_k$, and a and b are integers, with $0 \leq offset_k < N_{Block}$, $1 \leq a \leq P/N_{Block}$, $1 \leq b \leq N_s$.

At step 404, the clock cycle count is incremented. At step 404, when the clock cycle count is incremented, the count value is compared to the maximum clock cycle count value and, if the maximum count value is reached, the method ends; otherwise, the method advances to step 405.

Note that, at step 403, if the row address for a consecutive row extends beyond the end of the present consecutive column, the row address should wrap around and start from the beginning row. Consequently, at step 405, a test determines whether row address was wrapped around. If the test of step 405 determines that row address did not wrap around, the method returns to step 402 for the next $N_s$ sample set. If the test of step 405 determines that row address did wrap around, the method advances to step 406. At step 406, when the row address re-starts from the beginning row after wrapping around, the column offset values for the present and subsequent samples are incremented. Thus, when the column address extends beyond the end of the present row, the column address will wrap around in the same row and be mapped to the beginning column, and so on.

The present invention is described for efficient memory partition by interleaving during reading of samples in a sequence from a source to memory, but decoder 104 might be configured as an LDPC decoder to process samples given in a matrix of values where sequences of data are assumed read into the matrix column-wise, such as that shown in FIG. 2. Consequently, a barrel shifter present in an LDPC decoder might be configured with an extra offset value when reading rows of values from memory partitioned as described with respect to FIGS. 3 and 4 to re-shuffle values for decoding. The extra barrel shift offset value depends on the column address index of the first sample written into the memory row.

Figure 6:
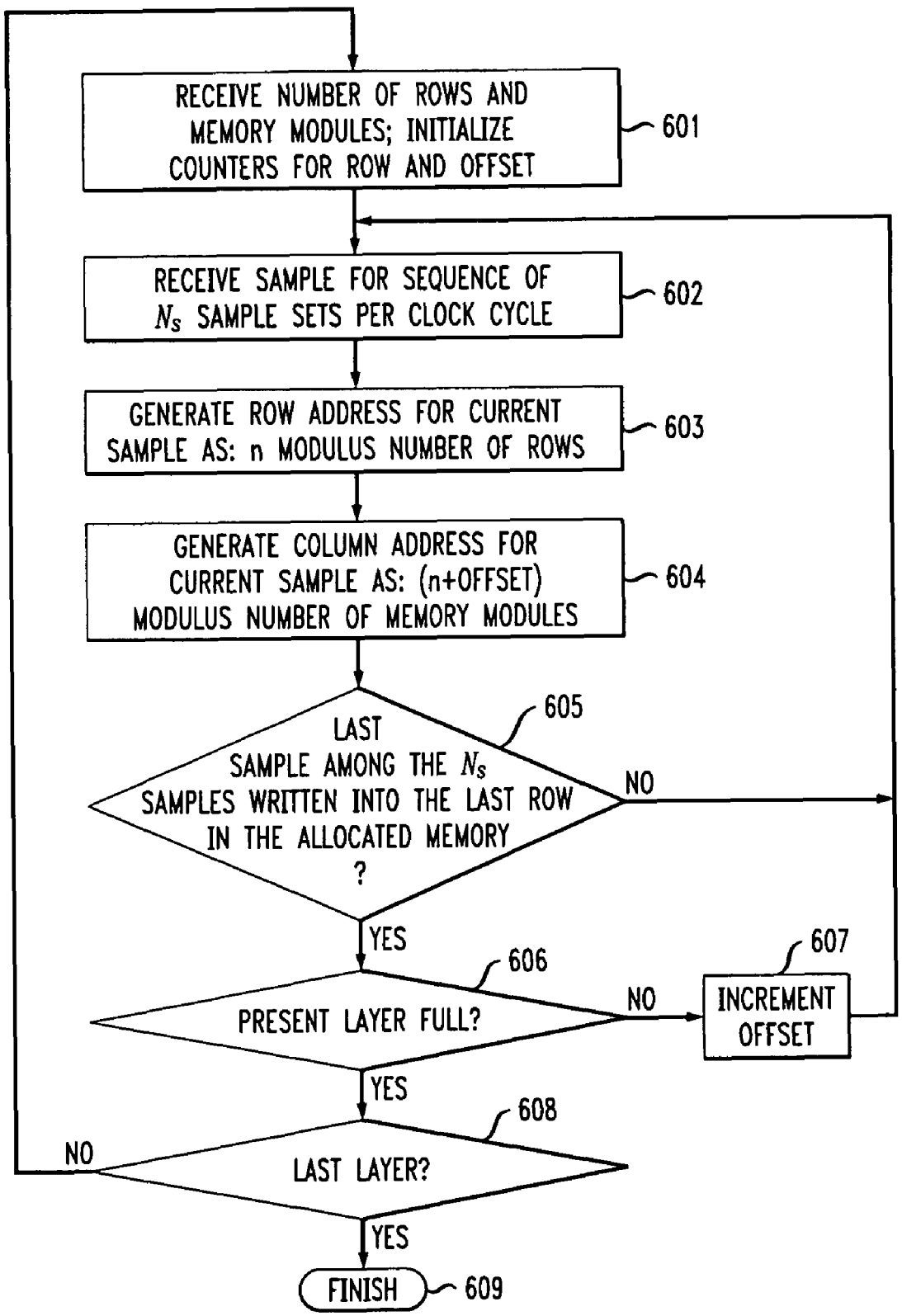
FIG. 6 shows a method for interleaving a sequence of input samples in accordance with a second exemplary skewed-memory-partition interleaver function of the present invention.

FIG. 5 shows a desired memory partition after interleaving a sequence of input samples in accordance with the method of FIG. 6. FIG. 6 shows a method for interleaving a sequence of input samples in accordance with a second exemplary SMPI function of the present invention. The second exemplary SMPI function is an interleaver design based on layers, where memory is divided into N modules and each memory module has (P/N) columns, with a layer containing the kth columns in all partitions and each layer using the same interleaving function. The second exemplary SMPI function exhibits an advantage in that the method employed by allocating memory addresses in the SMPI function uses as its basic parameter the number of rows in the desired interleaver table.

Referring to FIG. 5, the memory partition is shown for a single layer with a memory partition having N=4 memory modules. FIG. 5 shows the first columns 501*a*, 501*b*, 501*c*, and 501*d* of a memory module 500. In contrast to the first exemplary method shown in FIGS. 3 and 4 in which the next sample beyond the bottom sample in a column is assigned to the top position of the next column (e.g., sample x(1+M) inserted at column (2), row (1) (row 502(2)) of the partitioned memory, and so on), the second exemplary method shown in FIGS. 5 and 6 assigns the next sample beyond the bottom sample in a column in the next position down from the first sample position of the same column, and so on (e.g., sample x(1+M) inserted at column (1), row (2) of the partitioned memory, and so on).

Referring to FIG. 6, method 600 interleaves samples as follows to generate samples in a memory partition in accordance with the second exemplary SMPI function of the present invention. At step 601, for the first layer, the method receives the number of rows (numRow) and number of memory modules (numBank) in the memory partition for the current input data matrix, and initializes counter values for the row number and offset (where offset is a counter value to count up to the maximum number of columns in the memory partition for each layer).

At step 602, the method receives as input the current sample for the sequence of $N_s$ sample groups per clock cycle. Here, for the exemplary embodiment, the number $N_s$ equals the number of banks, numBank. At step 603, the row address, row(n), for the current sample is generated as n modulo numRow (where rows are counted for counter integer "n", $0 \leq n \leq$ (numRow−1)). At step 604, the bank index, col(n), for the current sample is generated as (n+offset) modulo numBank.

At step 605, a test determines if the row address of the last sample in the sequence of $N_s$ samples points to the last row in the memory partition. If the test of step 605 determines that the row address of the last sample does not point to the last row of the memory partition, then the method returns to step 602 for the next sequence of $N_s$ sample. If the test of step 605 determines that the row address of the last sample does point to the last row of the memory partition, then the method advance to step 606 where a test determines if the present layer is full. If the test of step 606 determines that the current layer is not full, then in step 607 the offset value (column counter) is incremented and the method returns to step 602. If the test of step 606 determines that the layer is full, the method advances to step 608 to test whether the current layer is the last layer of the input matrix. If the test of step 608 determines that the current layer is not the last layer, then the method returns to step 601 to begin the process for the next layer. If the test of step 608 determines that the current layer is the last layer, then the method finishes at step 609 to provide the memory-partitioned samples to, for example, the LDPC decoder.

An exemplary Matlab code writing data from input_data[ ] into each interleaver layer is as follows, where numRow is the number of rows in the memory partition and numBank is a number of columns in a layer of a memory module:

```
itlv_layer=zeros(numRow, numBank);
col_offset=[0,1,2,3, ... N−1];
ind=0;
for num=0:numRow*numBank−1
    row=mod(num,numRow);
    if row==0&&mod(num,numBank)==0
        ind=ind+1
        col=col_offset (ind);
    else
        col=mod(col+1, numBank);
    end
    itlv_layer(row+1, col+1)=input_data[num+1];
end
```

An example for the state machine for each layer, as described above for the second exemplary SMPI function of the present invention, with various values of numRow (number of rows in the matrix/memory partition) is shown in FIGS. 7A-7D. FIG. 7A shows a sample position table for the state machine with numRow=8; FIG. 7B shows a sample position table for the state machine with numRow=9; FIG. 7C shows a sample position table for the state machine with numRow=10; and FIG. 7A shows a sample position table for the state machine with numRow=11.

The sample position tables of FIGS. 7A-7D might be implemented with logic corresponding to a simple state machine as follows (where rows are counted for n, $0 \leq n \leq$ (numRow−1)):

```
offset←0, for n=0:numRow*4−1
row(n)=mod (n,numRow)
col(n)=mod(n+offset,4)
if row(n)==numRow−1, and 4 divides n+1, then increment offset
```

Again, as described with respect to the exemplary embodiment of FIGS. 3 and 4, and the exemplary embodiment of FIGS. 5 and 6, an LDPC decoder might receive samples given a circulant matrix of values where sequences of data are assumed read into the matrix column-wise, such as the index order that shown in FIG. 2. Consequently, a barrel shifter present in an LDPC decoder might be configured with a shift offset when reading values from memory partitioned as described with respect to FIGS. 3 and 4 to re-shuffle values for decoding, and a barrel shift processor (numBank way) for cases in FIGS. 7A~7D and data swapping for cases in FIGS. 7B and 7D need to be configured when reading values from memory partitioned as described with respect to FIGS. 5 and 6. The data stored in the same layer using the method of FIGS. 5 and 6 might be hard wired to be adjacent columns according to the matrix in FIG. 2.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method of allocating data samples arranged as a matrix to positions in memory defined with row and column addresses, the method comprising the steps of:
   (a) generating a memory partition, wherein the memory partition comprises a plurality of modules, each module having corresponding locations in the memory defined by a set of row/column addresses;
   (b) interleaving, on a layer-by-layer basis, samples of sample sets from the matrix of samples, wherein each layer comprises selected columns of each module, the step of interleaving each sample set comprising the steps of:
      (b1) allocating consecutive samples of the sample set to skewed-consecutive row addresses for the layer, and
      (b2) repeating step (b1) for subsequent sample sets for the layer based on a skewed-memory-partition interleaver (SMPI) function.

2. The invention of claim 1, wherein the step (b1) allocates a consecutive sample to a skewed-consecutive row address beyond a last available address in a column by a cyclic-shift of the address to the beginning of the column.

3. The invention of claim 1, wherein the step (a) of generating the memory partition divides the memory into at least $N_{Block}$ modules, the value of $N_{Block}$ being a positive integer greater than 1, and the memory partition comprises a column partition of at least $N_{block}$ modules.

4. The invention of claim 1, wherein the method step (b) applies the SMPI function for a layer with a state machine defined by:
   offset←0, for n=0:numRow*numBank−1
   row(n)=mod (n,numRow)
   col(n)=mod(n+offset,numBank)
   if row(n)==numRow, and numBank divides n+1, then offset←offset+1
   wherein "offset" is a count value related to an offset in address for a column, "n" is a counter value, "row(n)" is a row address for count value n, "col(n)" is a column address for count value n, "numBank" is the number of columns in a layer of the memory partition and "numRow" is the number of rows in the memory partition.

5. The invention of claim 1, wherein the method is implemented by a processor.

6. The invention of claim 1, further comprising step (d) of providing an interleaved sample matrix of interleaved samples from the sequence of samples after step (b) completes interleaving the last layer.

7. The invention of claim 6, wherein the interleaved sample matrix of interleaved samples is an interleaved circulant matrix for an iterative decoder.

8. The invention of claim 1, wherein, for step (b), if a column address for the first sample of a next sample set for a layer is before the last column address of a layer, the first sample of the next sample set for a layer is allocated to the same column of the layer based on an offset related to a number of samples in the sample set.

9. The invention of claim 8, wherein, for step (b), if the column address is beyond the last column address of a layer, the method allocates consecutive samples of the next sample set for the layer with a first sample of the next sample set adjacent to the first sample of the first sample set for the layer.

10. The invention of claim 9, wherein the method allocates consecutive samples of the next sample set for the layer with the first sample of the next sample set row-adjacent to the first sample of the first sample set for the layer.

11. The invention of claim 9, wherein the method allocates consecutive samples of the next sample set for the layer with the first sample of the next sample set column-adjacent to the first sample of the first sample set for the layer.

12. A method of reading data samples from positions in memory defined with row and column addresses, the method comprising the steps of:
   (a) reading, from a memory partition, a sequence of data values on a data set-by-data set basis, wherein the memory partition comprises a plurality of modules, each module having corresponding locations in the memory defined by a set of row/column addresses;
   (b) de-interleaving, on a layer-by-layer basis, data values of the data sets, wherein each layer comprises selected columns of each module, the step of de-interleaving each data set comprising the steps of:
      (b1) allocating consecutive data values of the data set from skewed consecutive-row addresses for the layer, and
      (b2) repeating step (b1) for subsequent data sets for the layer based on a skewed-memoir-partition de-interleaver (SMPI) function to provide a matrix of the data samples.

13. The invention of claim 12, wherein the step (b1) allocates a consecutive sample from a skewed-consecutive row address beyond a last available address in a column by a cyclic-shift of the address from the beginning of the column.

14. Apparatus for decoding samples to provide data decisions, the apparatus comprising: a de-interleaver, wherein the deinterleaver is adapted to:
- (i) read, from a memory partition, a sequence of data values on a data set-by-data set basis, wherein the memory partition comprises a plurality of modules, each module having corresponding locations in the memory defined by a set of row/column addresses;
- (ii) de-interleave, on a layer-by-layer basis, data values of the data sets to provide an input matrix of de-interleaved samples, wherein each layer comprises selected columns of each module, the de-interleaver de-interleaving each data set by:
  - repeatedly allocating to the input matrix of de-interleaved sample values consecutive data values of each data set from skewed consecutive-row addresses for the layer for a current data set based on a skewed-memory-partition de-interleaver (SMPI) function; and an iterative decoder, wherein the iterative decoder applies an iterative decoding algorithm to the input matrix of de-interleaved sample values to generate a corresponding matrix of decisions for the input matrix of de-interleaved sample values.

15. The invention of claim 14, further comprising an interleaver, wherein the interleaver is configured to: generate a memory partition, wherein the memory partition comprises a plurality of modules, each module having corresponding locations in the memory defined by a set of row/column addresses; interleave, on a layer-by-layer basis, samples of sample sets from a matrix of samples, wherein each layer comprises selected columns of each module, the step of interleaving each sample set comprising the steps of:
- (b1) allocating consecutive samples of the sample set to skewed-consecutive row addresses for the layer, and
- (b2) repeating step (b1) for subsequent sample sets for the layer based on a skewed-memory-partition interleaver (SMPI) function to provide the matrix of data values.

16. The invention of claim 14, wherein the apparatus is embodied in a read-channel integrated circuit.

17. The invention of claim 14, wherein the de-interleaver allocates a consecutive sample from a skewed-consecutive row address beyond a last available address in a column by a cyclic-shift of the address from the beginning of the column.

18. The invention of claim 17, wherein the iterative decoder is a low-density parity-check code (LDDC) decoder, and the input matrix of interleaved sample values is a circulant matrix.

19. The invention of claim 17, wherein the iterative decoder comprises a barrel shifter configured to rearrange the interleaved sample values of the circulant matrix prior to applying the decoding algorithm to provide each cyclic shift.

20. A non-transitory machine-readable storage medium, having encoded thereon program code, wherein, when the program code is executed by a machine, the machine implements a method for allocating data samples to positions in memory defined with row and column addresses, comprising the steps of:
- (a) generating a memory partition, wherein the memory partition comprises a plurality of modules, each module having corresponding locations in the memory defined by a set of row/column addresses;
- (b) interleaving, on a layer-by-layer basis, samples of sample sets from a sequence of samples arranged in a matrix, wherein each layer comprises selected columns of each module, the step of interleaving each sample set comprising the steps of:
  - (b1) allocating consecutive samples of the sample set to skewed-consecutive row addresses for the layer, and
  - (b2) repeating step (b1) for subsequent sample sets for the layer based on a skewed-memory-partition interleaver (SMPI) function.

* * * * *